Jan. 19, 1937.    J. L. STRATTON    2,068,577
COMPENSATING CIRCUIT
Filed Nov. 20, 1935
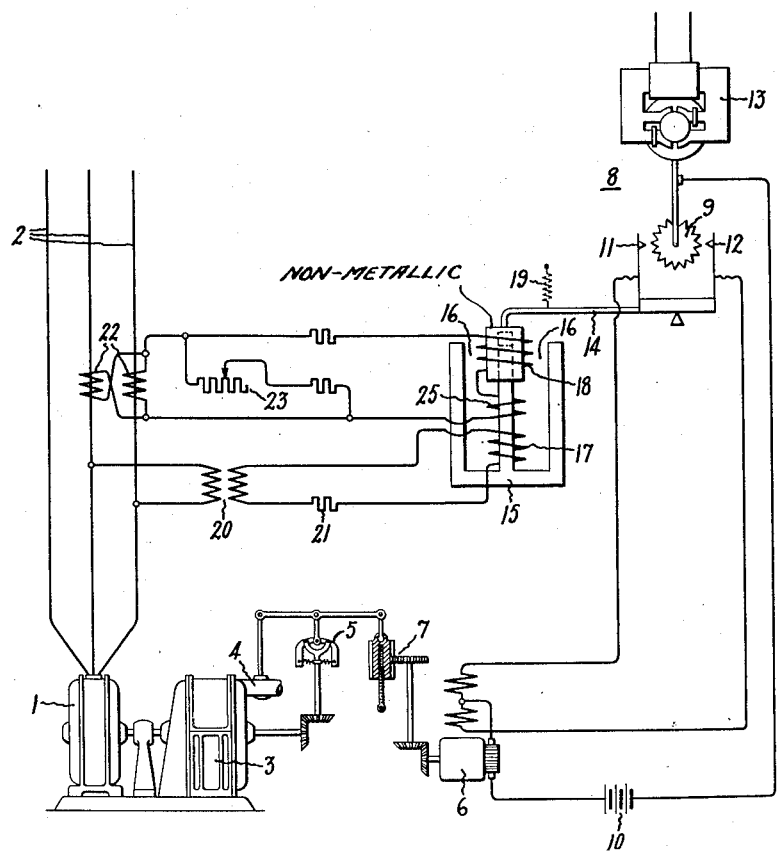
Inventor:
Jerry L. Stratton,
by Harry E. Dunham
His Attorney.

Patented Jan. 19, 1937

2,068,577

UNITED STATES PATENT OFFICE 2,068,577

COMPENSATING CIRCUIT

Jerry L. Stratton, Schenectady, N. Y., assignor to General Electric Company, a corporation of New York Application November 20, 1935, Serial No. 50,667

7 Claims. (Cl. 175—335)

My invention relates to electrical compensating circuits and more particularly to improvements in multi-coil electromagnetic devices, such as alternating current power responsive relays.

When two coils are so arranged that one is movable in the magnetic field produced by the other and when the coils are connected to be responsive respectively to the current and voltage of an alternating current circuit, the force exerted on the movable coil is substantially proportional to the product of the in-phase components of current and voltage. That is to say, it is proportional to EI cos $\theta$, when E represents the voltage, I represents the current and $\theta$ represents the phase angle between the current and voltage. This force, therefore, is proportional to the power flow in the circuit and consequently such a device can be used as a power responsive controller for relays and regulating systems. In most power circuits the current is too large to be led directly through the current coil of such a power responsive device and consequently a current transformer is usually connected between the circuit and the current coil.

A convenient way of adjusting the value of power at which the device will operate is to connect an adjustable rheostat in parallel with the current coil, that is to say, across the secondary winding of the current transformer, so as to by-pass more or less of the current from the current transformer. In certain of the above described arrangements, I have found that a voltage which is induced by the potential coil causes an objectionable and error-producing circulating current to flow through the current winding and through the rheostat.

In accordance with my invention, I compensate for or eliminate this current by means of a compensating coil which is relatively loosely inductively coupled to the current coil and which has a voltage induced therein, by the voltage coil, that can be used to cancel the voltage induced in the current coil. Perhaps the simplest way of doing this is to connect the compensating coil in series opposition to the current coil so that the two voltages induced respectively in the current coil and the compensating coil, by the potential coil, will neutralize each other.

An object of my invention is to provide an improved compensating circuit.

Another object of my invention is to provide a new and improved electromagnetic power responsive device.

My invention will be well understood from the following description taken in connection with the accompanying drawing and its scope will be pointed out in the appended claims.

Referring now to the single feature of the accompanying drawing, I have shown therein diagrammatically an embodiment of my invention as applied to an automatic regulating or control system for the power output of an alternating current generator 1. This generator is connected to a three-phase alternating current load circuit 2 and it is driven by any suitable means, such as a turbine 3. The turbine 3 has a steam inlet valve 4 which is controlled by a conventional speed governor 5, the setting of which is controlled by a reversible electric motor 6, usually referred to as a synchronizing motor, through a suitable and well-known linkage 7. The arrangement is such that when the electric motor 6 turns in one direction, the setting of the speed governor 5 is changed so as to cause the governor 5 to open the steam valve further at a particular normal speed and when the motor operates in the reverse direction, the steam inlet valve 4 has its opening reduced for the particular normal speed of the governor 5.

The operation of the motor 6 is controlled by an automatic regulator 8 having a rotating contact 9 to which one terminal of the motor 6 is connected through a suitable source of power, such as a battery 10, and having two contacts 11 and 12 connected respectively to the reversing terminals of the motor 6. When the contact 11 engages contact 9 a circuit through the motor 6 is completed and the motor operates in one direction whereas when the contact 12 engages the contact 9 a reverse connection is established for the motor 6 and it operates in the reverse direction. At other times, the motor 6 is stationary and the contacts 11 and 12 are out of engagement with contact 9. The surface of contact 9 is rough in shape and it is termed in the art a star wheel. This contact, while stationary in the sense that it is not moved into and out of engagement with the contacts 11 and 12, is rotated by any suitable device, such as an alternating current self-starting synchronous motor 13, which may be connected to any suitable source of alternating current supply such as a conventional 110 volt, 60 cycle circuit. The purpose of the rotation of the star wheel 9 is to provide anti-hunting for the regulator. The operation is such that the engagement between the contact 9 and either contact 11 or contact 12 is periodic or intermittent thus producing a notching or jogging action of the motor 6 so as to prevent over-shooting of the regulating operation.

The motion of contacts 11 and 12 is controlled through an arm 14 by means of an electromagnetic power responsive device comprising a magnetic core 15 having an air gap 16. Mounted on the core 15 is a relatively fixed potential coil 17, while mounted within air gap 16 is a relatively movable current coil 18. The current coil 18 is mounted on a suitable spool which is fastened to the arm so that the magnetic force produced on the relatively movable current coil 18 is transmitted through the arm 14 to the contacts 11 and 12. This arrangement may be so adjusted that this force is normally downward and at a certain load value on circuit 2 will be balanced by the force of a counter-spring 19. The potential coil 17 is energized by means of a potential transformer 20 having its primary winding connected between two of the conductors of the load circuit 2. A suitable current limiting resistor 21 is shown connected in series with the winding 17. The current winding 18 is energized by means of a pair of cross-connected current transformers 22. With such an arrangement, the resultant current output of the two cross-connected current transformers 22 will be in phase with the voltage between the conductors across which the primary winding of the transformer 20 is connected at unity power factor in circuit 2.

The current in the current coil 18 is adjusted by means of an adjustable impedance or rheostat 23 connected in parallel with the current coil 18, that is to say connected across the secondaries of the current transformers 22. Adjustment of the impedance value of the device 23 varies the amount of current by-passed through the impedance.

I have discovered that in the above described arrangement, the potential coil 17 induces a voltage in the current coil 18 which produces an objectionable circulating current which flows through the rheostat 23. This produces an error in the operation of the device because the current in the current coil is then not proportional to the current in the power circuit. In order to overcome this I provide a compensating winding 25 which is relatively closely inductively coupled with the potential winding 17 and which is relatively loosely inductively coupled to the current winding 18. By connecting this winding 25 in series opposition and providing it with the proper number of turns, the voltage induced in it by the voltage winding 17 can be made equal and opposite to the voltage induced in the current winding 18. In this manner these two induced voltages cancel each other thereby eliminating the objectionable and error producing circulating current. Since the compensating coil is loosely coupled with the current coil it does not nullify the action of the current coil and since it is fixed in positon, it can contribute no force to the movable element.

While I have shown and described a particular embodiment of my invention, it will be obvious to those skilled in the art that changes and modifications may be made therein without departing from my invention and I, therefore, aim in the appended claims to cover all such changes and modifications as fall within the true spirit and scope of my invention.

What I claim as new and desire to secure by Letters Patent of the United states, is:

1. In an alternating current electromagnet, a pair of cooperating coils one of which induces an objectionable current in the other, and a compensating coil electrically connected to the coil in which the objectionable current is induced and relatively closely inductively coupled to the other of said coils, said compensating coil being so wound as substantially to eliminate said objectionable current.

2. In an alternating current electromagnet, a pair of relatively movable cooperating coils one of which induces an objectionable current in the other, and a compensating coil connected in series opposition with and relatively loosely inductively coupled to the coil in which the objectionable current is induced, said compensating coil being relatively closely coupled to the other of said coils.

3. In an alternating current relay, a current coil, a potential coil which induces a voltage producing an objectionable current in said current coil, and a compensating coil arranged to have an equal voltage induced therein by said potential coil, said current coil and compensating coil being so interconnected that said voltages neutralize each other.

4. In an alternating movably mounted current relay, a current coil having a relatively low impedance circuit, a fixed potential coil which induces a voltage producing an objectionable circulating current in said current coil, and a compensating coil connected in series opposition with said current coil and arranged to have a voltage induced therein by said potential coil.

5. In an alternating current power responsive relay, a current coil, an adjustable impedance connected in parallel with said current coil for adjusting the value of current therein, a potential coil which induces a voltage in said current coil whereby an objectionable error producing current tends to circulate through said current coil and impedance, a compensating coil connected in series with and relatively loosely coupled to said current coil, said compensating coil being relatively closely coupled to said potential coil and being so arranged that the voltage induced therein by said potential coil neutralizes the voltage induced in said current coil.

6. In an alternating current power responsive relay, a current coil, an adjustable impedance connected in parallel with said current coil for adjusting the value of current therein, a potential coil which induces a voltage in said current coil whereby an objectionable error producing current tends to circulate through said current coil and impedance, said current and potential coils being relatively movable, a compensating coil connected in series with and relatively loosely coupled to said current coil, said compensating coil being relatively closely coupled to said potential coil and being so arranged that the voltage induced therein by said potential coil neutralizes the voltage induced in said current coil.

7. In an alternating current power responsive relay, a magnetic core having an air gap, a movable current coil mounted in said air gap and adapted to be energized by a current transformer, a rheostat connected across the secondary winding of the current transformer for adjusting the current in said current coil, a fixed potential coil for magnetizing said core, said potential coil inducing a voltage in said current coil which tends to circulate an objectionable error producing current through said current coil and rheostat, and a fixed compensating winding relatively closely coupled to said potential coil and relatively loosely coupled to said current coil, said compensating winding being connected in series with said current coil and having a voltage induced therein by said potential coil which is equal and opposite to the voltage induced in the current coil by the potential coil.

JERRY L. STRATTON.